Oct. 6, 1970 A. M. HESTAD ET AL 3,532,832
MESSAGE WAITING LAMP
Filed June 9, 1967
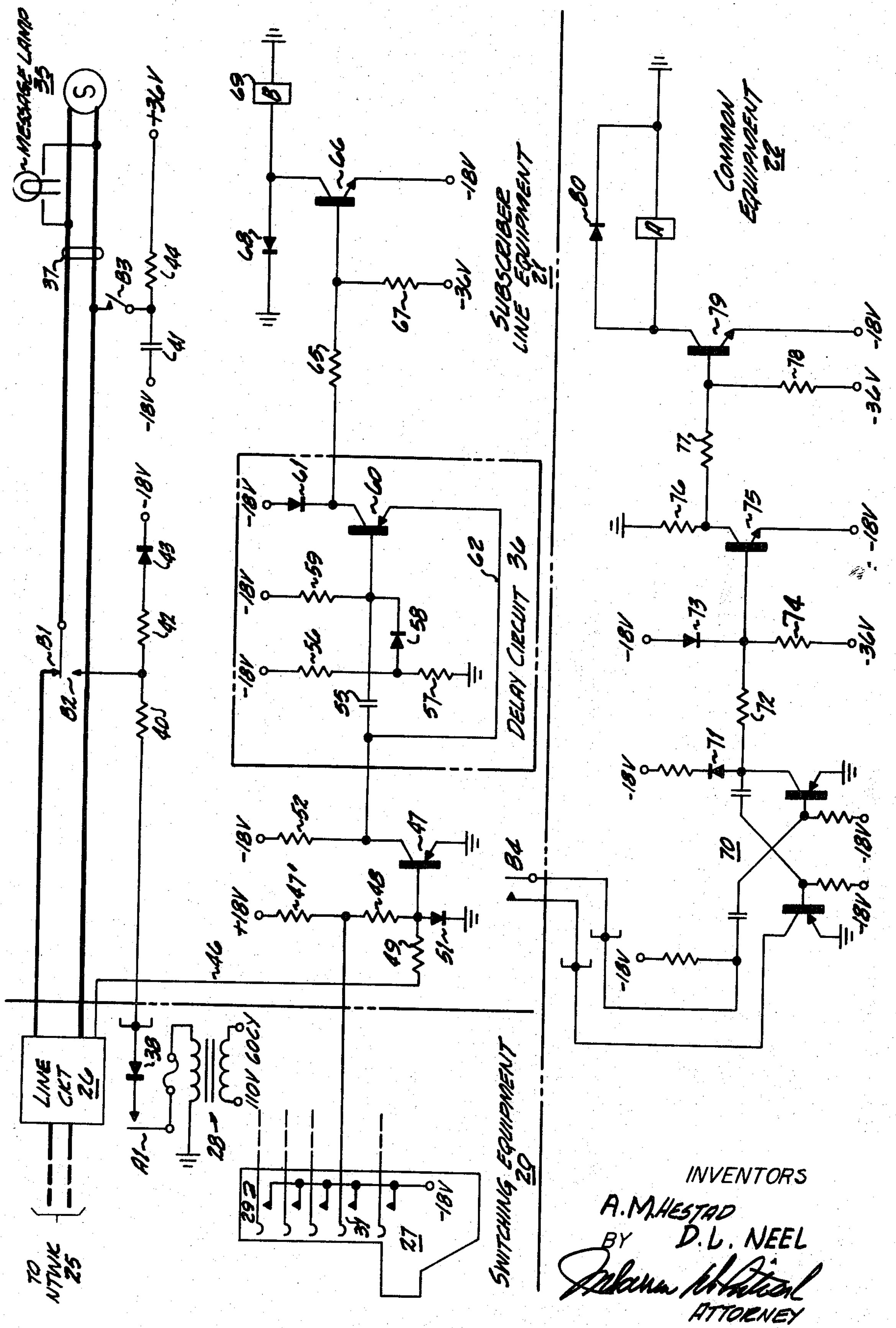
INVENTORS
A. M. HESTAD
D. L. NEEL
BY [signature]
ATTORNEY United States Patent Office 3,532,832
Patented Oct. 6, 1970

3,532,832

MESSAGE WAITING LAMP

Alfred M. Hestad, Chicago, and Donald L. Neel, Lombard, Ill., assignors to International Telephone and Telegraph Corporation, New York, N.Y., a corporation of Delaware Filed June 9, 1967, Ser. No. 645,020
Int. Cl. H04m *1/26*
U.S. Cl. 179—84 8 Claims

ABSTRACT OF THE DISCLOSURE

A telephone message waiting lamp system includes a plurality of telephone lines extending from an operator's position to a number of telephone stations. The operator closes a switch to apply A.C. to a line and thereby light a lamp at the station. Calls may be placed to and from the station irrespective of the message lamp current, which is removed for the duration of the call and then automatically reapplied at the end of the call.

This invention relates to PBX telephone systems and more particularly to means in such systems for lighting lamps at telephone stations to signal a message waiting condition.

Usually, hotels and motels are equipped with internal telephone systems which give telephone service to the individual rooms. This internal system may or may not be connected to an outside telephone network; that is irrelevant to the invention. In fact, a feature of the invention is that it has absolutely no effect upon the associated system regardless of whether it is central or local.

Since the guests might be out of their room when they are called, it has become commonplace to put a message waiting light on the telephone which may be lit at the option of the switchboard attendant or operator. Usually this lamp is lit when a message comes in, and it remains lit until the guest returns and calls the attendant or operator to receive his message.

The communication requirements of society are so very important that nothing may be allowed to interfere with them. Therefore, the addition of the message lamp and its associated control circuit must not interfere with normal telephone operations. The room guest must be able to place or receive calls regardless of whether the lamp is or is not lit. Moreover, the entire message service should be accomplished via the two talking wires normally provided to carry the voice currents since additional wires are very expensive to install.

In addition to these requirements of a message waiting system, there are the requirements of the switching equipment provided to give telephone service. All of the necessary signals must be allowed. No unwanted signals or spurious noise may be generated. This freedom from noise is especially important in electronic switching systems which might respond to apparent commands in an unwanted manner and cause a serious failure.

The invention is not limited to use with any particular switching system. However, it has a particular utility in conjunction with a PNPN diode switching system utilizing a network of the type disclosed by V. E. Porter in U.S. Pat. 3,204,044, granted Aug. 31, 1965, and assigned to the assignee of this invention.

Accordingly, an object of the invention is to provide new and improved message waiting lamp systems. In this connection, an object is to provide a system which is particularly free of noise and spurious signal simulations. Still further an object is to provide such a system which does not adversely influence a sensitive electronic switching system.

In keeping with an aspect of the invention, these and other objects are accomplished by means of an electronically driven relay which applies a lamp current to a line, which is tripped by any calls to or from the line, and which is nonresponsive to normal signals. If calls are completed while a lamp is lit, the lamp will go out so that it will not interfere with normal usage. However, it automatically turns on again when the call ends.

The above mentioned and other features of this invention and the manner of obtaining them will become more apparent, and the invention itself will be best understood by reference to the following description of an embodiment of the invention taken in conjunction with the single sheet of drawing which is a schematic diagram of the inventive message waiting system.

Dot-dashed lines divide the drawing into its major parts. These are switching equipment 20, subscriber line equipment 21, and common equipment 22. The switching equipment includes any suitable automatic switching network 25 connected to subscriber lines via conventional line circuits—such as 26. In addition, an attendant or operator position 27 is provided for giving the usual switchboard services in any suitable manner. A fused power transformer 28 provides the current required to light the message lamp.

The switchboard 27 includes a bank of key switches 29, there being one key for each line having a message lamp associated therewith. If an operator at the switchboard 27 wishes to light a lamp at a particular station, she closes the key contacts associated with that station. For example, contacts 31 are associated with station S. If she wants to cancel the lamp, she merely opens these same contacts. In a similar manner, a lamp may be lit at any other selected station by the simple expedient of closing another of the key switches 29 associated with that station.

Each of the subscriber lines includes all of the equipment 21. This equipment includes the station S, a message waiting lamp 35, a relay B and its electronic control circuit. The electronic circuitry includes a delay circuit 36 which makes the relay B insensitive to normal open loop dial pulses. This line equipment 21 may be installed at any location conveniently near the line circuit 26. Therefore, only two wires 37 are required to connect it to the telephone station S.

Means are provided for originating or receiving calls without regard as to whether the lamp 35 is or is not lit. In greater detail, the lamp circuit extends from a source of 110 v., 60 c.p.s. commercial power through transformer 28, contacts A1, an isolating diode 38 and current limiting resistor 40, operated contacts B2, the lamp 35, contacts B3, and an A.C. short circuit capacitor 41 to a —18 v. source. No details are shown concerning the circuit for completing the connection between the lamp 35 and line conductors 37. Those connections could vary with the installation requirements, and they are within the skill of the art. The D.C. path for off-hook signals completed while the lamp 35 is lit may be traced from a —18 v. source through diode 43, resistor 42, contacts B2, closed hook-switch contacts in station S, contacts B3, resistor 44, and a +36 v. source. The line circuit 26 detects the appearance of the current resulting from the completion of this —18 v. circuit through the station S and the lower one of the conductors 37 to line circuit 26. The diode 38 blocks the half-cycles from the source 28 which would be short circuited through the diode 43, thereby forcing the A.C. through the lamp 35.

Means are provided for effectively disconnecting the lamp control circuit whenever the line is busy. More specifically, whenever the line circuit 26 is busy, wire 46 is marked with a positive potential which holds a PNP transistor 47 in a turned off condition. As will become apparent, this prevents the lamp circuit from having any effect upon line 37 when the line circuit 26 indicates that the line 37 is in use. It should be noted that the line circuit is marked busy responsive to incoming calls without regard to whether the subscriber station S has or has not gone off hook.

The resistor 47' is connected to a +18 v. source to provide a base bias for causing the transistor 47 to act as a D.C. switch. The input driver resistors 48, 49 limit current and provide interstage coupling. The diode 51 is a clamp which also prevents a grounding of the −18 v. applied through the contacts 31 to the resistor 48. Resistor 52 is a collector load.

Means are provided for making the lamp circuit insensitive to dial signals. This means includes a delay circuit 36 which has a time constant exceeding the duration of an acceptable dial pulse. The components of the circuit 36 are a coupling and timing capacitor 55, a voltage dividing bias circuit 56, 57, an isolating diode 58, a bias resistor 59, a PNP transistor 60 used as an electronic switch, a clamping diode 61 used in conjunction with the collector load 65, and a controlled emitter bias circuit 62.

The collector of transistor 60 is connected through a current limiting interstage coupling resistor 65 to an NPN amplifier transistor 66 having its base bias supplied through a resistor 67. The collector load for the transistor 66 is the B relay 69 and an associated spark protection diode 68.

The common equipment 22 includes a conventional free-running multivibrator 70 which is turned on when the contacts B4 are closed and turned off when contacts B4 are opened. The diode 71 in the collector load of the output side of the multivibrator is provided for isolation to preclude a short circuit to the −36 v. source connected to the resistor 74.

The resistor 72 is a current limiting interstage coupling which interconnects the multivibrator and a two stage amplifier. Diode 73 is a clamp, and resistor 74 supplies a bias potential to an NPN transistor 75 which is used as the first stage of the amplifier. The resistor 77 is another current limiting interstage coupling. Base bias is supplied via resistor 78 to the second stage NPN transistor amplifier 79. The collector load for this second stage amplifier 79 is a relay A shunted by a spark protection diode 80. Thus, at its contacts A1, relay A interrupts the A.C. source 28 at a rate set by the multivibrator 70.

The bias potentials are such that the two unnumbered transistors in the multivibrator 70 and the transistor 75 are turned on during idle conditions. All remaining transistors are turned off during similar idle conditions.

The circuit operates this way. In any suitable manner, the operator learns that it is necessary to light a message waiting lamp 35 as a notice to the guest in the room with station S that he should call the operator.

To light the lamp 35 the operator closes switch 31. This applies a negative bias (−18 v.) through the contacts 31 and resistor 48 to the base of the transistor 47, which turns on. The emitter ground of transistor 47 is then applied over wire 62 to the emitter of the transistor 60. Since this emitter is now positive relative to the negative potential applied through the resistor 59, the transistor 60 turns on. Responsive thereto, ground is applied through the emitter-collector circuits of the transistors 47, 60 (in series) and through the resistor 65 to the base of the NPN transistor 66. Since the base of this transistor 66 is now positive relative to its emitter, it turns on. Current flows to operate the relay B.

Contacts B4 close to start the free-running multivibrator 70 for generating a flashing A.C. signal. Each time that the right-hand multivibrator transistor turns on, a ground potential is applied through the resistor 72 to make the base of the NPN transistor 75 more positive than its emitter, and it turns on. Conversely, when the right-hand multivibrator transistor turns off, the transistor 75 also turns off. Therefore, it is obvious that the transistor 75 is a driving amplifier which behaves as a slave of the multivibrator.

Whenever, the transistor 75 turns off, the ground applied through resistors 76, 77 makes the base of the NPN transistor 79 positive relative to its emitter, and it turns it on. When the transistor 75 turns on, its negative emitter voltage turns off the transistor 79. It should now be clear that current through transistor 79 operates and releases the interrupter relay A at a cyclic speed set by multivibrator 70—which may be a one second period, for example.

Relay A controls contacts A1 to intermittently apply A.C. power to the line via the circuit transformer 28, contacts A1, diode 38, resistor 40, contacts B2, lamp 35, contacts B3, capacitor 41, and the −18 v. source. Therefore, the lamp 35 flashes at the speed set by the multivibrator 70. In the present state, it continues to flash until the operator opens the contacts 31.

If the subscriber at station S places or receives a call when the lamp is so lit, he removes his receiver and completes a D.C. loop from a −18 v. source through diode 43, resistor 42, contact B2, the hook switch in the station S, contacts B3, and resistor 44 to a +36 v. source. The line circuit 26 detects the resulting flow of current and marks conductor 46 with a positive potential. The base of the transistor 47 becomes positive relative to its emitter, and it turns off. The emitter ground at the transistor 47 is removed to release the B relay 69.

The contacts B1 close while the contacts B3 and B4 open. This returns the voice circuit to normal, stops the multivibrator 70, and extinguishes the lamp 35.

When the subscriber hangs up, the positive potential disappears from the conductor 46. If the contacts 31 are still closed, relay B reoperates, and the lamp 35 relights. When the contacts 31 open, the light goes out.

Next, assume that the subscriber at station S places a call while the lamp 35 is extinguished. Dial pulses are transmitted in the form of open loop pulses. The line circuit 26 applies and removes a positive potential to and from the conductor 46 as the line 36 appears to be switching back and forth between busy and idle conditions. The resulting effects could cause the transistor 47 to turn on and off. However the time constant introduced into circuit 36 by the capacitor 55 prevents any significant response in the transistors 60, 66. Therefore, the relay 69 does not operate, and the message lamp circuit does not interfere with normal operations.

While the principles of the invention have been described above in conjunction with specific apparatus and applications, it is to be understood that this description is made only by way of example and not as a limitation on the scope of the invention.

We claim:

1. A message waiting lamp control system comprising an operator position having a plurality of subscriber telephone stations connected thereto via a plurality of individually associated two wire lines, a plurality of line equipment circuits individually associated with the operator ends of said two-wire lines, there being one such line equipment for each of said lines, operator controlled means for applying an A.C. lamp current to a selected one of said two wire lines, thereby lighting the lamp associated with said line, and means for completing calls over said line irrespective of whether said lamp current is on said one line.

2. The system of claim 1 wherein each of said line equipments comprises an electronically driven relay, contacts on said relay for completing a connection from a source of said lamp current at said operator end and over said line to a lamp associated with the subscriber end of said line, and means responsive to an occurrence of a call condition on said line for releasing said relay for the duration of said call, said relay automatically reoperating for relighting said lamp at the end of said call condition.

3. A message waiting lamp control circuit comprising an electronically driven relay for applying lamp current to a two wire telephone line, means responsive to call conditions on said line for tripping said relay to extinguish said lamp for the duration of said call condition, said lamp relighting at the end of said call condition, and means for precluding an interference between said lamp current and normal communications over said line.

4. The circuit of claim 3 and timing means for measing the duration of a period exceeding the period of a normal dial pulse, and means responsive to said timing means for precluding said relay from responding to dial pulses.

5. The circuit of claim 3 comprising an operator position having a bank of key switches associated therewith, there being a key for selecting each of a plurality of lamps, and means responsive to operation of one of said keys for operating the relay associated with the corresponding line.

6. The circuit of claim 3 and means for originating and receiving calls without regard as to whether said lamp is or is not lit.

7. The circuit of claim 5 wherein said tripping means comprises means for effectively disconnecting said lamp control circuits from said line when said line is busy.

8. The circuit of claim 6 and second electronically driven relays for cyclically interrupting said lamp current, and means for switching on said second relay responsive to a demand for lamp current and switching off said second relay responsive to a termination of said demand.

References Cited

UNITED STATES PATENTS

| | | | |
|---|---|---|---|
| 699,582 | 5/1902 | Shaffner | 179—84 |
| 2,884,491 | 4/1959 | Breen | 179—84 |

KATHLEEN H. CLAFFY, Primary Examiner

W. A. HELVESTINE, Assistant Examiner